INVENTOR
FREDERICK B. HOFF JR.
BY

June 15, 1965 F. B. HOFF, JR 3,189,747

CIRCUIT FOR CONTROLLING THYRATRON TYPE DEVICES EITHER INDIVIDUALLY OR AS A GROUP

Filed June 5, 1962 3 Sheets-Sheet 2

INVENTOR.
FREDERICK B. HOFF JR.
BY
Gilbert C. Clayff

June 15, 1965 F. B. HOFF, JR 3,189,747

CIRCUIT FOR CONTROLLING THYRATRON TYPE DEVICES EITHER INDIVIDUALLY OR AS A GROUP

Filed June 5, 1962

3 Sheets-Sheet 3

INVENTOR.
FREDERICK B. HOFF JR.
BY

United States Patent Office 3,189,747

Patented June 15, 1965

3,189,747

CIRCUIT FOR CONTROLLING THYRATRON TYPE DEVICES EITHER INDIVIDUALLY OR AS A GROUP

Frederick B. Hoff, Jr., Richardson, Tex., assignor to Hunt Electronics Company, Dallas, Tex., a corporation of Texas Filed June 5, 1962, Ser. No. 200,254
9 Claims. (Cl. 307—32)

The present invention relates to switching circuits and more particularly to switching circuits in which a plurality of loads may be controlled either individually, in groups of desired sizes, or simultaneously.

The present invention is especially useful for those applications, such as theatre lighting, in which a number of loads must be susceptible of being controlled either individually or as a group.

In the past, such control has most often been obtained by utilizing a master variac for controlling the power applied to groups of loads and individual variacs for controlling the power applied to individual loads. Because of the large amount of power that is sometimes involved, a master variac must usually be of very large size and very expensive. It is often necessary that even the individual variacs be capable of handling large amounts of power.

According to the present invention, an electronic control circuit utilizing thyratron type devices is provided. The control circuitry itself is very small and dissipates virtually no power. One or more thyratron type devices are provided for controlling the power applied to any particular load, depending upon the size of the load and the capacity of the devices used.

A phase shift circuit is associated with load for controlling the conduction time of the thyratron type devices controlling a particular load. A variable element is provided as an integral part of each of the phase shift networks for varying the phase angle relationship between the applied line voltage and the firing signal which controls the conduction of a particular thyratron type device or devices.

In addition, each of the phase shift networks are interconnected such that a master control affects each of the phase shift networks to an equal degree, thereby providing simultaneous control of all thyratron type devices, and hence all loads. Great versatility is obtained by the present invention in that as many intermediate controls as may be necessary for controlling particular individual loads or groups of loads can be provided.

Many objects and advantages of the invention will become readily apparent to those skilled in the art as the following detailed description of the same unfolds when taken into conjunction with the appended drawings wherein like referenced numerals denote like parts and which FIGURE 1 is a block diagram illustrating the principles of the present invention;

Figure 1:
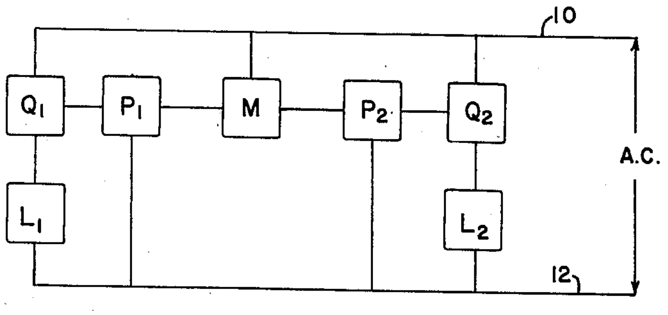

Turning now to FIGURE 1 of the drawings, the principles of the present invention are depicted in block diagram form. As shown in FIGURE 1, the line voltage is supplied by lines 10 and 12 to the loads $L_1$ and $L_2$. The flow of current through the load $L_1$ is controlled by a thyratron type device $Q_1$ and the flow of current through the load $L_2$ is controlled by a thyratron type device $Q_2$.

A phase shift network $P_1$ is connected between line 12 and the master control M which is connected to line 10. A second phase shift network $P_2$ is also connected between the master control M and the line 12. The phase shift network $P_1$ is coupled to the thyratron type device $Q_1$. The thyratron type device $Q_1$ is caused to conduct responsive to a firing signal produced by the phase shift network $P_1$. By varying the phase angle between the firing signal produced by phase shift network $P_1$ and the applied line voltage, the device $Q_1$ can be caused to conduct for any desired portion of a half cycle thereby controlling the effective power applied to the load $L_1$ in the manner known in the art. In similar fashion, the phase shift network $P_2$ is coupled to and controls conduction of the thyratron type device $Q_2$, which controls the flow of current through the load $L_2$.

Each of the phase shift networks $P_1$ and $P_2$ include as an integral element a variable component which controls the phase angle relationship between the line voltage and firing signal. The master control M comprises a variable element which is effective to control to a substantially equal degree the phase relationship between the line voltage and the firing signals produced by each of the phase shift networks $P_1$ and $P_2$.

Figure 2:
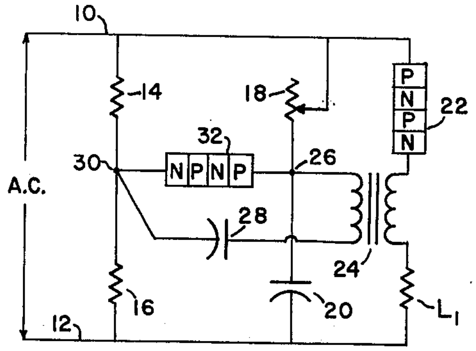
FIGURE 2 is a schematic illustration of a preferred type of phase shift network for use in practicing the present invention.

Turning now to FIGURE 2 of the drawings, a preferred type of phase shift network for use in practicing the invention is illustrated. The phase shift network of FIGURE 2 is seen to comprise a pair of resistors 14 and 16 connected in series between lines 10 and 12 to which a source of A.C. voltage may be applied. A variable resistor 18 and a capacitor 20 are also connected in series between the lines 10 and 12, the resistor 18 and capacitor 20 being in parallel with the resistor 14 and resistor 16. The load $L_1$ and the four layer semiconductor diode 22 which functions as the thyratron type switch $Q_1$ are connected in series between the lines 14 and 16.

The firing signal generated by the phase shift network is coupled to the device $Q_1$ by transformer 24 through a secondary winding connected in series with the device $Q_1$ and the load $L_1$. One side of the primary winding of transformer $T_1$ is connected to junction point 26 between the resistor 18 and the capacitor 20. The other side of the primary winding is connected through capacitor 28 to the junction point 30 between resistor 14 and resistor 16. A second four layer semiconductor diode 32 which exhibits thyratron type switching characteristics is connected between the junction points 26 and 30 as shown.

In operation of the circuit of FIGURE 2, a firing signal is produced between the junction points 26 and 30. The phase of the firing signal depends upon the relative impedance of the resistor 18 and the capacitor 20, and may be varied by varying the variable resistor 18. The amplitude of the firing signal produced is dependent on the relative resistance of the resistors 14 and 16 and the phase angle between the firing signal and the applied line voltage.

The forward breakover characteristics of the device 22 is such that line voltage will not cause the device 22 to switch from its high impedance state to its low impedance state. On the other hand, the device 32 is one whose characteristics are such that the firing signal developed between the points 26 and 30 will cause it to switch from its high impedance state to its low impedance state, preferably in the early part of the half cycle.

During positive half cycles, that is those cycles in which line 10 is positive with respect to line 12, the capacitor 28 is charged through a charge path comprising of the resistor 18, the primary winding of the transformer 24 and resistor 16 until such time as the firing signal attains sufficient amplitude to cause the device 32 to switch to its low impedance state. At that time, a low impedance path is provided for the discharge of capacitor 28 through the device 32 in a direction from junction point 30 to junction point 26.

The discharge of the capacitor 28 through the device 32 produces a current pulse that induces a sufficiently high voltage in the secondary winding of transformer 24 to cause the device 22 to switch to its low impedance state and allow conduction through the load L for the balance of the positive half cycle. Control of power is achieved by varying the phase angle relationship between the applied line voltage and the firing signal developed between the junction points 26 and 30. For a more complete understanding of the operation of this circuit and the circuits shown in FIGURES 4 and 6, if such be necessary, reference may be had to co-pending United States patent application, Serial Number 184,841, filed April 3, 1962, and assigned to the assignee of the present invention.

Figure 3:
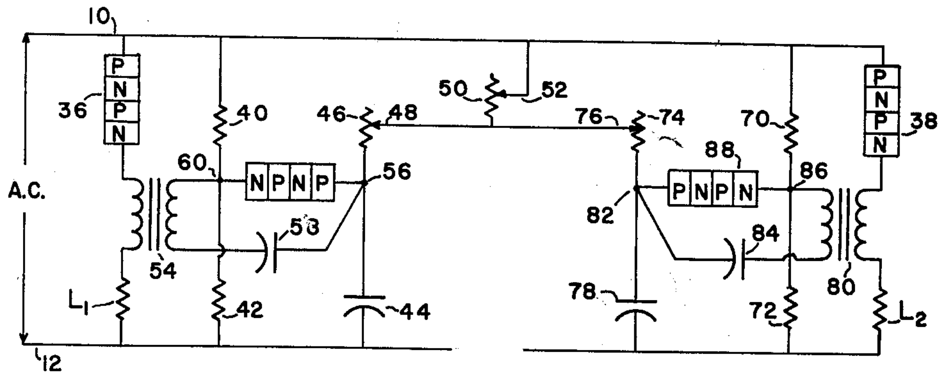
FIGURE 3 is a schematic diagram illustrating the manner in which phase shift networks of the type shown in FIGURE 2 may be connected to be controlled individually or by a master control.

FIGURE 3 illustrates a manner in which two or more circuits of the type illustrated in FIGURE 2 can be controlled individually or a master control may be utilized to achieve simultaneous control of a plurality of such circuits. As shown, a pair of loads $L_1$ and $L_2$ are each connected in parallel between lines 10 and 12. A four layer semiconductor device 36 is connected in series with the device $L_1$ for purposes of controlling the flow of current through the load $L_1$ and, in similar fashion, a four layer semiconductor device 38 is connected in series with the load $L_2$ for the purpose of controlling the flow of current through load $L_2$. A phase shift network of the type described with reference to FIGURE 2 is provided for controlling the conduction time of the device 36. The phase shift network for controlling the device 36 includes a resistor 40 connected in series with a resistor 42. Resistors 40 and 42 are connected between the lines 10 and 12 in parallel with the device 36 and the load $L_1$. The under terminal of the capacitor 44 is also connected to line 12. The over terminal of capacitor 44 is connected to the under side of the variable resistor 46. The tap 48 of the variable resistor 48 is connected to the under terminal of a variable resistor 50, which functions as the master control. The tap 52 of the resistor 50 is connected to line 10. The secondary winding of the transformer 54 is connected in series with the device 36 and the load $L_1$, and one side of the primary winding of the transformer 54 is connected to the junction point 56 between resistor 46 and capacitor 44. The other side of the primary winding of the transformer 54 is connected through the capacitor 58 to the junction point 60 provided between the resistors 40 and 42. A four layer semiconductor diode 62 is connected between the junction points 56 and 60.

From the above, it is seen that the phase shift network provided for controlling the conduction time of the device 36 is similar to the phase shift network described with reference to FIGURE 2, the principal difference being that the variable resistors 46 and 50 in combination serve as the variable resistor 18. Thus, adjusting either of the variable resistor 46 or the variable resistor 50 will vary the phase angle relationship between the applied line voltage and the firing signal produced between the junction points 56 and 60.

The phase shifting network associated with the load $L_2$ is quite similar in form to the phase shifting network associated with load $L_1$ and includes a resistor 70 connected in series with a resistor 72. The resistor 70 and 72 are connected between lines 10 and 12. A variable resistor 74 having a tap 76 which is connected to the under side of the resistor 50 is also provided. The under terminal of the resistor 74 is connected through the capacitor 78 to line 12. In similar fashion, a transformer 80 is provided whose secondary winding is connected in series with the four layer semiconductor device 38 and the load $L_1$. The primary winding of the transformer 80 is connected to the junction point 82. The other side of the primary winding of transformer 80 is connected through the capacitor 84 to the junction point 86 provided between the resistors 70 and 72. A four layer semiconductor device 88 is connected between the junction points 82 and 86. The phase angle between the applied line voltage and the firing signal produced between the junction points 82 and 86 can be varied by varying the variable resistor 74 or by varying the variable resistor 50.

Thus, to achieve individual control of the load $L_1$, the variable resistor 46 is adjusted to provide the desired phase angle relationship between the signal which controls conduction of the device 36 and the applied line voltage. In similar fashion, individual control of the current flowing through the load $L_2$ can be achieved by varying the resistor 74 to produce the desired phase relationship between the firing signal produced between the junction points 82 and 86 with respect to the applied line voltage to achieve the necessary conduction time of the device 38 to provide the desired power level. If it is desired to control the current flowing through the loads $L_1$ and $L_2$ simultaneously, the variable resistor 50 is adjusted. The change in resistance of the variable resistor 50 affects the phase shift networks equally, changing the phase angle relationship that exists between the applied line voltage and the firing signal produced between the junction points 56 and 60 and the firing signal produced between the junction points 80 and 84. The conduction time of the devices 36 and 38 is dependent upon the phase relationship between the firing signals and the applied line voltage thereby allowing the variable resistor 50 to control the flow of current through both the loads $L_1$ and $L_2$.

Figure 4:
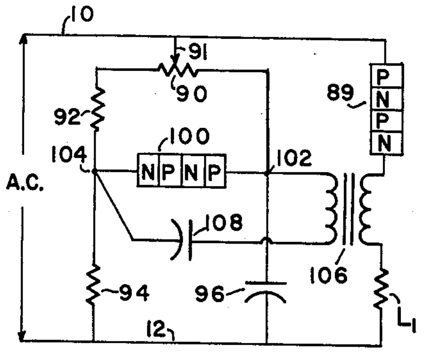
FIGURE 4 is a schematic illustration of a different circuit for achieving power control of thyratron type devices by phase shift network.

In FIGURE 4 a somewhat different phase shifting means is illustrated. As shown, the device 89 is connected in series with the load $L_1$ between the lines 10 and 12. The phase shift network itself includes a variable resistor 90 whose tap 91 is connected to the line 10. One side of the resistor 90 is connected through resistor 92, and resistor 94 to the line 12. The line 12 is also connected to the under side of capacitor 96. The over terminal of the capacitor 96 is connected to the other side of the resistor 90. A four layer semiconductor diode 100 is connected between the junction point 102 formed between the resistor 90 and the capacitor 96 and the junction point 104 formed between the resistor 92 and the resistor 94. The firing signal produced by the phase shift network is coupled to the device 89 which it controls by a transformer 106. The secondary winding of the transformer 106 is connected in series with the device 89 and the load $L_1$. One side of the primary winding of the transformer 106 is connected to junction point 102. The other side of the primary winding of the transformer 106 is connected through capacitor 108 to junction point 104.

Reference may be had to previously mentioned patent application, Serial Number 184,841, assigned to the common assignee of this application for a fuller description of the manner in which the circuit described with reference to FIGURE 4 operates and the advantages of this particular circuit over the one described with reference to FIGURE 2. However, suffice it to say that in general the operation of the two circuits is quite similar. The phase angle of the firing signal with respect to the applied line voltage is varied by varying the variable resistor 90. The principal advantage of the circuit described with reference to FIGURE 4 over the circuit described with reference to FIGURE 2 is that when the tap of the resistor 90 is moved in the direction of junction point 102 to reduce the phase angle between the firing signal and the applied line voltage to a minimum, the maximum instantaneous value of the firing signal is increased due to the effective increase in the resistance of the resistor 92. The increase in the magnitude of the firing signal allows the device 89 to be controlled for a greater portion of a half cycle and also allows the capacitor 108 to be charged to a higher value.

Figure 5:
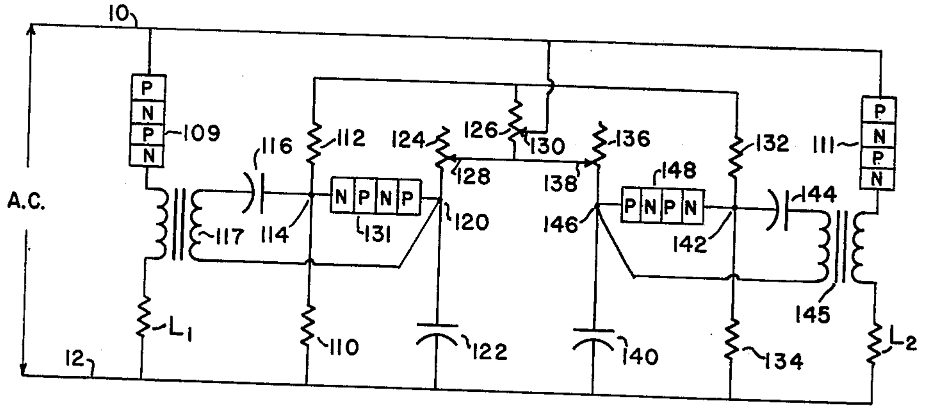
FIGURE 5 is a schematic diagram illustrating the manner in which circuits such as that shown in FIGURE 4 may be controlled by a master control or individually.

Turning now to FIGURE 5, the manner in which phase shift networks of the type shown in FIGURE 4 may be connected to permit a plurality of loads to be controlled either individually or by a single master control is illustrated. As shown, the loads $L_1$ and $L_2$ to be controlled are connected in parallel between the lines 10 and 12. Devices 109 and 111 are connected in series with the loads $L_1$ and $L_2$ respectively, for purposes of controlling the current flowing through the loads. The phase shift network which controls the conduction time of the device 109 includes a resistor 110 which is connected to the line 12. The over terminal of the resistor 110 is connected to resistor 112. The junction point 114 defined between the resistor 110 and resistor 112 is connected through a capacitor 116 to one side of the primary winding of a transformer 117 which couples the firing signal to the device 109, the secondary winding of transformer 117 being connected in series with the device 109 and the load $L_1$. The other side of the primary winding of the transformer 117 is connected to junction point 120 formed between a capacitor 122 and a variable resistor 124. The under terminal of the capacitor 122 is connected to the line 12. The over terminal of the resistor 124 is connected to the over terminal of the resistor 112, and to the over terminal of the variable resistor 126. The variable resistor 126 comprises the master control according to this embodiment of the invention. The tap 128 of the variable resistor 124 is connected to the under terminal of the resistor 126 and the tap 130 of the resistor 126 is connected to line 10. A four layer semiconductor device 131 is connected between junction point 114 and junction point 120.

The phase shift network associated with the load $L_2$ and device 111 is of similar configuration to the phase shift network described immediately above. It includes a resistor 132 which is connected through resistor 134 to the line 12. The over terminal of resistor 132 is connected to variable resistor 136 and to the over terminal of resistor 126. The tap 138 of the variable resistor 136 is connected to the under terminal of the resistor 126. The under terminal of the resistor 136 is connected through capacitor 140 to line 12. The junction point 142 between resistor 132 and resistor 134 is connected through the capacitor 144 to one side of the primary winding of the transformer 145. The other side of the primary winding of transformer 145 is connected to the junction point 146 between resistor 136 and capacitor 140. A four layer semiconductor device 148 is connected between the junction point 142 and the junction point 146. The secondary winding of the transformer 145 is connected in series with the device 111 and the load $L_2$ for purposes of coupling the firing signal produced by the phase shift network to the device 111 to control the conduction of the device 111.

From the above, it is evident that the variable resistor 126 is included as an integral portion of each of the phase shift networks and is, therefore, effective to simultaneously control the phase angle relationship between the applied line voltage and the firing signals produced by each of the phase shift networks. The variable resistor 126 is, therefore, effective to control the flow of current through each of the devices 109 and 111 and thereby contain simultaneous control of the power applied to the loads $L_1$ and $L_2$. On the other hand, variable resistors 124 and 136 are effective to control the phase relationship of only the phase shift network of which they are an integral portion. Thus, the variable resistor 124 is effective to control the power flowing through only load $L_1$ and the variable resistor 136 is effective to control the power applied to load $L_2$ only.

The circuitry described with reference to FIGURES 1 through 5 has been with particular reference to certain two terminal semiconductor devices which conduct asymmetrically, that is, in only one direction. Therefore, only half wave power can be applied to the load. Full wave power control can be obtained utilizing the above circuits by providing a symmetrical device for each of the asymmetrical devices shown, by connecting oppositely poled asymmetrical device in parallel with each of the devices shown or other means well known in the art. A plurality of similarly poled devices can be connected in parallel, if necessary, to provide increased power handling capability.

Figure 6:
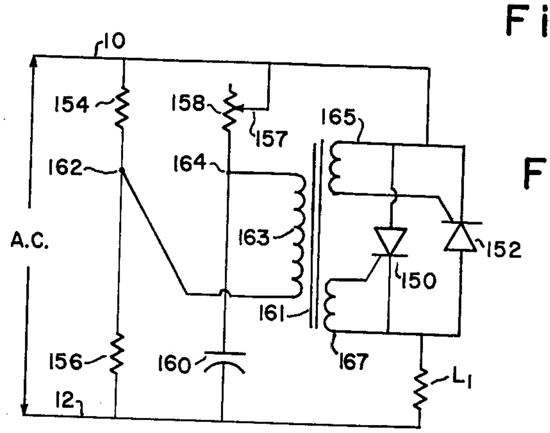
FIGURE 6 is a schematic illustration of still a third type of phase shift network that may be utilized to achieve power control of the thyratron type device.

FIGURE 6 illustrates the manner in which three terminal thyratron type devices may be utilized to control the current flowing through a load. Such a circuit is also disclosed in the co-pending application, Serial Number 184,841, referred to previously.

As shown in FIGURE 6, the load $L_1$ through which the flow of current is to be controlled is connected between the lines 10 and 12. A pair of oppositely poled three terminal controlled rectifiers 150 and 152 are provided for controlling the current flowing through the load $L_1$. By providing two oppositely poled devices, full wave control of the power flowing through load $L_1$ is obtained.

The devices 150 and 152 are controlled from a high impedance state or a low impedance state by a phase shift network. As shown, line 10 is connected through a resistor 154 and resistor 156 to line 12. Line 10 is also connected to a tap 157 on a variable resistor 158. The under terminal of the variable resistor 158 is connected through a capacitor 160 to line 12.

A transformer 161 having a primary winding 163 and two secondary windings 165 and 167 is provided for coupling the firing signal produced between junction points 162 and 164 to control the impedance state of the devices 150 and 152. When the line 10 is positive with respect to line 12, the device 150 is energized from its normally high impedance state to its low impedance state by application of a firing signal to its gate electrode through the secondary winding 167. The device 150 will conduct for a portion of the positive half cycle depending on the phase angle relationship between the firing signal produced across the junction points 162 and 164. This phase relationship is controlled by varying the variable resistor 158.

During negative half cycles, that is those half cycles in which line 12 is positive with respect to line 10, the device 152 can be caused to switch from its high impedance state to its low impedance state by application of a firing signal through the secondary winding 165. The conduction time during the negative half cycles will, as before, be dependent on the phase angle relationship between the applied voltage and the firing signal generated between junction points 162 and 164.

Figure 7:
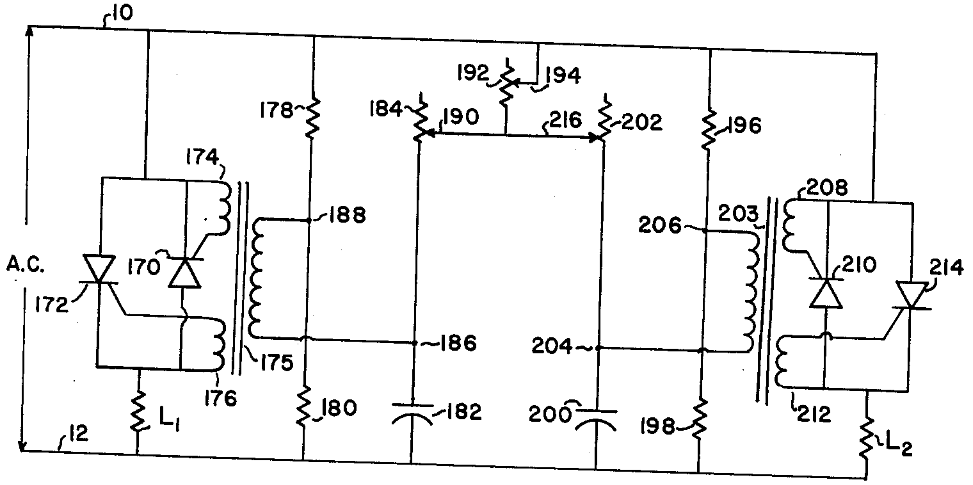
FIGURE 7 is a schematic diagram depicting the manner in which two or more circuits such as that shown in FIGURE 6 may be connected to be controlled either individually or by a master control.

Loads controlled by circuits such as shown in FIGURE 6 can be connected to achieve simultaneous control of a plurality of loads as shown in FIGURE 7. The circuitry of FIGURE 7 is quite similar to that of FIGURE 3, the principal difference being in the manner coupling the firing signal to the devices which control the flow of current through the load.

As shown in FIGURE 7, the loads $L_1$ and $L_2$ are connected in parallel between lines 10 and 12. A pair of oppositely poled three terminal thyratron type devices 170 and 172 are provided to control the flow of current through the load $L_1$. Secondary winding 174 of the transformer 175 is connected between the cathode and the gate electrode of the device 170 to control the device 170 from the high impedance to the low impedance state. A secondary winding 176 is connected between the gate electrode and the cathode of the device 172 for purposes of controlling the impedance state of the device 172. The line 10 connects to the over terminal of resistor 178 which is connected through resistor 180 to line 12. The under terminal of the capacitor 182 is connected to line 12 and the over terminal of capacitor 182 is connected to variable resistor 184. The junction point 186 between the resistor 184 and the capacitor 182 is connected to one side of the primary winding of the transformer 175. The other side of the primary winding of transformer 175 is connected to junction point 188 between resistor 178 and resistor 180. The tap 190 provided on the variable resistor 184 is connected to the under terminal of variable resistor 192. The tap 194 on the variable resistor 192 is connected to line 10.

The phase control network for controlling the flow of current through load $L_2$ is identical to that described with reference to the control of the load $L_1$. It includes a resistor 196 whose over terminal is connected to the line 10. The under terminal of resistor 196 is connected through resistor 198 to the line 12. The under terminal of capacitor 200 is connected to the line 12 and the over terminal of the capacitor 200 is connected to resistor 202. The primary winding of the transformer 203 is connected to the junction point 204 between resistor 202 and capacitor 200 and junction point 206 between resistor 196 and resistor 198. Secondary winding 208 connected between the cathode and the gate electrode of three terminals thyratron type device 210 and the secondary winding 212 is connected between the cathode and the gate electrode of a three terminal device 214. The devices 210 and 214 control the flow of current through the load $L_2$ in the manner described previously. The tap 216 of the variable resistor 202 is connected to the under terminal of variable resistor 192.

The conduction time of the devices 170 and 172 is controlled by varying the variable resistor 184 and the conduction time of the devices 210 and 214 is controlled by varying the variable resistor 202. In addition, simultaneous control of the current flowing through both the load $L_1$ and the load $L_2$ can be achieved by varying the variable resistor 192 to simultaneously shift the phase relationship between the various firing signals with respect to the line voltage.

Figure 8:
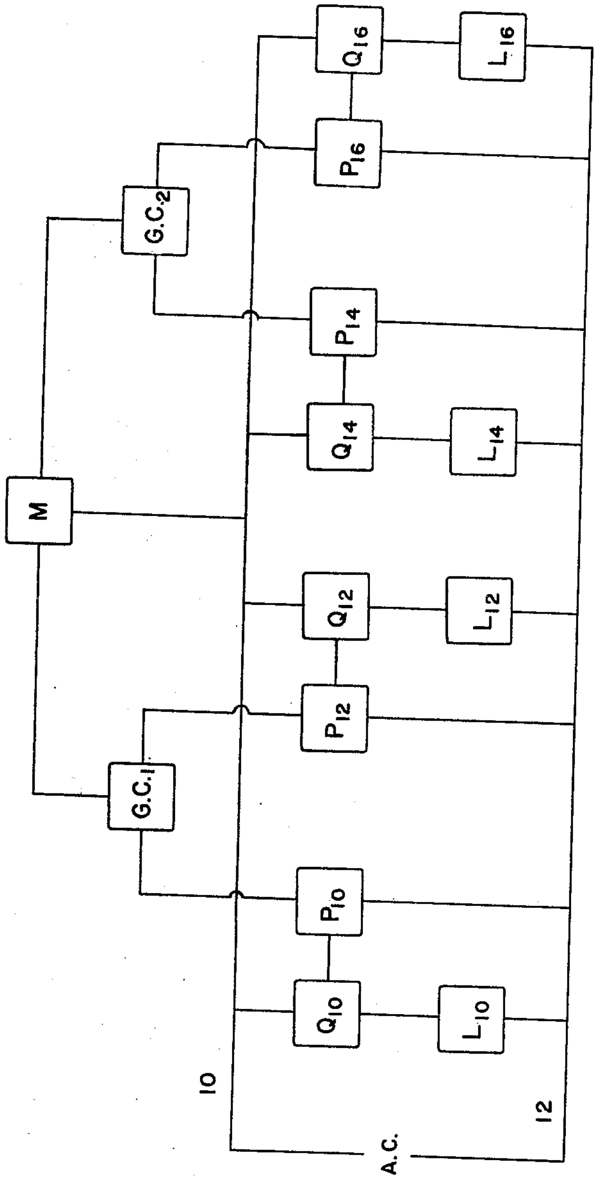
FIGURE 8 is a block diagram illustrating the manner in which large numbers of loads can be controlled either individually, in small groups of any desired size, or simultaneously.

Using the principles of the present invention, it is possible to achieve a high degree of flexibility in that large numbers of loads can be controlled either individually, in groups of a particular desired size or all simultaneously. Such a system is shown in block diagram form in FIGURE 8. As shown in FIGURE 8, four different loads, $L_{10}$, $L_{12}$, $L_{14}$ and $L_{16}$ are connected in parallel between lines 10 and 12 to which a source of A.C. power is applied. A suitable device capable of being switched to a low impedance state is associated with each of the loads for controlling the flow of current through the load. The devices are denoted $Q_{10}$, $Q_{12}$, $Q_{14}$ and $Q_{16}$ respectively. A phase shift network $P_{10}$, $P_{12}$, $P_{14}$ and $P_{16}$ is provided for controlling the impedance state of each of the devices $Q_{10}$, $Q_{12}$, $Q_{14}$ and $Q_{16}$ respectively. Each of the phase shift networks $P_{10}$ and $P_{12}$ are connected to a group control GC–1 which is capable of simultaneously controlling the current flowing through the loads $L_{10}$ and $L_{12}$. The circuitry described to this point could be identical to the circuitry described with reference to either FIGURES 3, 5 or 7. In similar fashion, the phase control networks $P_{14}$ and $P_{16}$ are connected to the group control GC–2. The phase shift network $P_{14}$ controls the flow of current through the load $L_{14}$ and the phase control network $P_{16}$ controls the flow of current through the load $L_{16}$ providing the desired individual control of the loads. The group control GC–2 provides a means by which the loads $L_{14}$ and $L_{16}$ can be controlled as a group independent of any other groups of loads. The group controls GC–1 and GC–2 are each connected to the master control M which is connected to the line 10. The master control M provides simultaneous control of each of the loads $L_{10}$ through $L_{16}$ by controlling to an equal degree the phase angle relationship between the applied line voltage and the various firing signals produced by each of the phase networks $P_{10}$ through $P_{16}$.

From the foregoing description, it is evident that in each instance an individual phase shift network is provided for controlling the power applied to the individual loads, and means are provided to simultaneously effect the phase relationship between line voltage and the firing signals of a desired group of phase shift networks. Additional means which control selected groups may also be provided.

In practicing the present invention, it is desirable that the various components which comprise the phase shifting networks be of relatively high impedance in order that they not dissipate large amounts of power and to allow them to be of very small size. Since the entire control network according to the preferred embodiment of the invention depends upon the generation of voltages rather than the control of current flow, it is necessary that only enough current flow to allow the capacitors to be charged if the embodiments of the invention described with reference to FIGURES 3 and 5 are used or to provide necessary gate currents or voltages if the embodiment of the invention described with reference to FIGURE 7 is used. It is also to be noted that if the components are not characterized by being of high impedance, the power drain through the various phase shift networks may be significant.

The variable resistor which serves as the group control or master control must obviously be capable of carrying the current which flows through the particular number of phase control networks which may be controlled by it. However, according to one system which has been built and tested, it was found practical to control three different loads, each drawing 600 watts of power for a total of 1800 watts of power with a 5 watt potentiometer as the master control element.

It is to be noted that the setting of particular controls limits the maximum power that can be caused to flow through the load. Thus, if the phase shift network $P_{10}$ is adjusted to allow one half of power to be applied to load 10, that the group control GC–1 or the master control M could only control the load to allow less than one half power to flow. However, this is not proved to be a detriment in many practical applications. Thus, for example, assuming that the system is to be utilized for theatre lighting, the individual controls can be adjusted to produce the proper blend of colored lights to produce the desired tonal effect. Thereafter, the group control or the master control can be varied as desired to produce the desired light intensity. As the group control or the master control is varied, the relative intensity of the different colored lights will remain substantially the same allowing the same tonal effects to be maintained. Thus, any particular light or load can be set to desired beginning maximum value and thereafter the master control can be utilized for controlling all of the loads from the set maximum level to the completely off condition.

The amount of power to be controlled is limited only by the current carrying capacity of the devices connected in series with the loads. If gas thyratrons are used as the control elements and control is obtained as described with reference to FIGURES 6 and 7, loads through which many amperes of current flow can be controlled.

The system is very efficient as the power dissipated in the control circuits is limited to a very low value by the high impedance of the control circuits. The leakage currents through the loads are severely limited by the high impedance of the thyratron type devices. However, if desired, the small amount of leakage can be eliminated, if deemed necessary, by incorporating mechanical type switches in series with the loads. These mechanical switches must, of course, be closed before control can be obtained.

It will be appreciated that many types of phase shift networks will be operative and that other means for coupling the firing signals to the switching elements may be used. Thus, many changes and modifications to the invention will be readily apparent to those skilled in the art in view of the foregoing description. Although the description has been made only with reference to certain preferred embodiments, the invention is to be limited not to what is disclosed herein but only as necessitated by the scope of the appended claims.

What I claim is:

1. A switching circuit for controlling the effective power applied to a plurality of loads either individually or as a group that comprises an individual thyratron type switch means connected in series with each respective one of said loads, an individual phase shift means associated with each respective one of said loads for controlling the conduction time of the individual thyratron type switch means connected in series with said load, said individual phase shift networks each producing a firing signal, means for applying the firing signal produced by each of said individual phase shift means to switch the thyratron type switch means connected in series with the load associated with said individual phase shift means to its low impedance state responsive to the presence of a firing signal, each of said individual phase shift means including a variable element effective to vary the phase relationship between the applied line voltage and the firing signal produced by said individual phase shift means thereby controlling the conduction time of said thyratron type switch means, and means connected in circuit with each of the individual phase shift networks associated within a group of loads for simultaneously varying the phase relationship between the applied line voltage and the firing signals produced by each of said phase shift networks within said group to simultaneously control the conduction time of each of said thyratron type switch means connected in series with each of said loads in said group.

2. A power control circuit that comprises a plurality of loads connected in parallel relationship across a source of alternating current supply voltage, individual thyratron type switch means connected in series with each respective one of said loads for controlling the flow of current through respective individual loads, individual phase shift means associated with each respective one of said loads for controlling the conduction time of the thyratron type switch means connected in series with the respective load, group control means having a variable element common to all of the individual phase shift means within a group and master control means having a variable element common to all group control means and all individual phase shift means not within a group that are desired to be controlled simultaneously, each group control means being effective to simultaneously control the conduction times of each thyratron type switch means within said group and said master control meas being effective to simultaneously control the conduction times of each thyratron type switch means within all of said groups and all thyratron type switch means not within a group to which said last named variable element is common.

3. A switching circuit for controlling the effective power applied to a plurality of loads from a source of alternating current supply voltage either individually or as a group that comprises a plurality of thyratroon type devices, means connecting at least one of said devices in series with each respective one of said loads, a plurality of phase shift means, means connecting each of said plurality of phase shift means to control the impedance state of the at least one of said devices connected in series with each respective one of said loads, each of phase shift means including a variable element whereby varying said variable element varies the conduction time of the respective at least one of said devices, and means including a variable element connected in circuit with the variable element of each of the phase shift means controlling the thyratron type devices effective to simultaneously vary the conduction time of a desired group of said devices.

4. A power control circuit that comprises a first load, a second load, means connecting said first load and said second load in parallel across a source of alternating current supply voltage, first thyratron type switch means connected in series with said first load, second thyratron type switch means connected in series with said second load, first variable phase shift means connected to control the conduction time of said first thyratron type switch means, second variable phase shift means connected to control the conduction time of said second thyratron type switch means each of said first and second variable phase shift means including a variable resistor connected to control the charging of a capacitor and thereby control the conduction time of the thyratron type switching means connected to the respective one of said variable phase shift means and master control means connected in circuit with said first and second phase shift means to simultaneously control the charging of the capacitors in said first and second phase shift means and thereby simultaneously control the conduction time of said first thyratron type device and said second thyratron type device.

5. A power control circuit as defined in claim 4 wherein said first variable phase shift means and said second variable phase shift means each comprise a bridge type phase shift network having said variable resistor and said capacitor connected in series in one leg thereof.

6. A power control circuit as defined in claim 4 wherein said master control means comprises a variable resistor connected in series with the variable resistor of said first phase shift means and in series with the variable resistor of said second phase shift means.

7. A switching circuit that comprises a first load, a second load, first thyratron switch means connected in series with said first load for controlling the flow of current through said first load, second thyratron type switch means connected in series with said second load for controlling the flow of current through said second load, a first phase shift network for producing a first firing signal, a second phase shift network for producing a second firing signal, means including a first transformer for applying said first firing signal to said first thyratron type switch means to control the impedance state of said first thyratron type switch means, means including a second transformer for applying said second firing signal to said second thyratron type switch means to control the impedance state of said second thyratron type switch means, said first phase shift network and said second phase shift network each including a first resistor and a second resistor connected in series and a first variable resistor and a capacitor connected in series, means connecting said second resistor and said capacitor to one terminal of source of applied line voltage and means including a second variable resistor common to said first phase shift network and said second phase shift network connecting said first variable resistor of said first phase shift network and said first variable resistor of said second phase shift network to another terminal of said source of applied line voltage, said first variable resistor of said first phase shift network being effective to vary the phase relationship between the applied line voltage and said first firing signal and said first variable resistor of said second phase shift network being effective to vary the phase relationship between the applied line voltage and said second firing signal and said second variable resistor being effective to simultaneously vary the phase relationship between the applied line voltage and said first firing signal and said second firing signal.

8. A switching circuit that comprises a first load, a second load, first thyratron type switch means connected in series with said first load for controlling the flow of current through said first load, second thyratron type switch means connected in series with said second load for controlling the flow of current through said second load, a first phase shift network for producing a first firing signal, a second phase shift network for producing a second firing signal, means including a transformer for applying said first firing signal to said first thyratron type switch means to control the impedance state of said first thyratron type switch means, means including a second transformer for applying said second firing signal to said second thyratron type switch means to control the impedance state of said second thyratron type switch means, said first phase shift network and said second phase shift network each including a first resistor and a second resistor connected in series and a first variable resistor and a capacitor connected in series, means connecting said second resistor and said capacitor to one terminal of a source of applied line voltage, means connecting said first resistor and said first variable resistor of said first phase shift network and said first resistor and said first variable resistor of said second phase shift network to one side of a second variable resistor, means connecting a tap on said first variable resistor of said first phase shift network and a tap on said first variable resistor of said second phase shift network to the other side of said second variable resistor, and means connecting a tap on said second variable resistor to the other terminal of said source of applied line voltage, said first variable resistor of said first phase shift network being effective to vary the phase relationship between the applied line voltage and said first firing signal, said first variable resistor of said second phase shift network being effective to vary the phase relationship between the applied line voltage and said second firing signal, and said second variable resistor being effective to simultaneously vary the phase relationship between the applied line voltage and said first firing signal and said second firing signal.

9. A switching circuit for controlling the effective power applied to at least two load individually and as a group comprising at least two switching devices, each of which normally exhibit a high impedance to the flow of current but which are capable of being excited to a low impedance state, means connecting each of said devices in series with a respective one of said loads in a source of alternating current supply voltage for controlling the effective power applied to the respective load from the power source, individual means coupled to each of said switching devices for generating and applying to said switching device a signal of a character to cause said switching device to switch from the high impedance state to the low impedance state for the remainder of the half cycle of applied alternating current supply voltage, each of said individual means including a first variable resistor, and means connecting each of said first variable resistances of the individual means within a group in series with a second variable resistor, variation of the resistance of the first variable resistor of an individual means coupled to one of said switching devices being effective to vary the phase relationship between the beginning of a half cyle of applied alternating current supply voltage and the switching of said one switching device and variation of the resistance of said second variable resistor being effective to simultaneously vary the phase relationship between the beginning of a half cycle of alternating current supply voltage and the switching of said at least two switching devices.

References Cited by the Examiner

UNITED STATES PATENTS

| | | | |
|---|---|---|---|
| 2,548,855 | 4/51 | Bartelink | 315—194 |
| 3,103,618 | 9/63 | Slater | 307—88.5 |

OTHER REFERENCES

Publication: G.E. Application Note, page 13, 200.19, March 1962.

ARTHUR GAUSS, *Primary Examiner.*